US012752250B2

(12) United States Patent
Weng et al.

(10) Patent No.: US 12,752,250 B2
(45) Date of Patent: Oct. 6, 2026

(54) MICROPLASMA DEVICE AND METHOD THEREOF

(71) Applicant: National Taiwan University of Science and Technology, Taipei (TW)

(72) Inventors: Ren-Jie Weng, Kaohsiung City (TW); Wei-Hung Chiang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 769 days.

(21) Appl. No.: 17/994,704

(22) Filed: Nov. 28, 2022

(65) Prior Publication Data

US 2024/0066494 A1 Feb. 29, 2024

Related U.S. Application Data

(60) Provisional application No. 63/400,778, filed on Aug. 25, 2022.

(51) Int. Cl.
*B01J 19/08* (2006.01)
*H05H 1/24* (2006.01)

(52) U.S. Cl.
CPC ............ *B01J 19/088* (2013.01); *H05H 1/247* (2021.05); *B01J 2219/00995* (2013.01); *B01J 2219/0877* (2013.01)

(58) Field of Classification Search
CPC .. B01J 19/088; B01J 2219/0877; H05H 1/247
See application file for complete search history.

(56) References Cited

U.S. PATENT DOCUMENTS

2014/0110380 A1* 4/2014 Kamath .................. H05H 1/36 219/121.39
2018/0333511 A1* 11/2018 Eden .................... H05H 1/2406
2019/0116657 A1* 4/2019 Fuller .................. H05K 1/0346

FOREIGN PATENT DOCUMENTS

CN 104291283 A 1/2015
CN 104013985 B 1/2017
(Continued)

OTHER PUBLICATIONS

X. Z. Huang et al., "Plasmonic Ag nanoparticles via environment-benign atmospheric microplasma electrochemistry". Nanotechnology, 2013, 24, 095604 (Year: 2013).*
(Continued)

*Primary Examiner* — Brian W Cohen
*Assistant Examiner* — Nathanael Jason Downes
(74) *Attorney, Agent, or Firm* — Best & Flanagan LLP

(57) ABSTRACT

The present invention provides a microplasma device and system thereof. The microplasma device comprises a reaction tank carrying with a reaction solution. A nanomaterial and its precursors are contained in the reaction solution. A first electrode is at least partially immersed in the reaction solution. A second electrode comprises a microplasma array component to eject microplasma array to the surface of the reaction solution. A power source is electrically connected between the first electrode and the second electrode. The present invention provides a novel microplasma array device to produce nanomaterial with increased yield rate. The microplasma array device can be multiplied by adding the outlet of the microplasma as desired to produce nanomaterial including but not limited to nano-metal particles, carbon quantum dots, silicon quantum dots and plasma-activated water with higher yield rate.

3 Claims, 8 Drawing Sheets

(56) References Cited

FOREIGN PATENT DOCUMENTS

| | | |
|---|---|---|
| TW | I548586 B | 9/2016 |
| TW | 1571302 B | 2/2017 |

OTHER PUBLICATIONS

CTS Resistors 770 Series Datasheet (Year: 2025).*

* cited by examiner

MICROPLASMA DEVICE AND METHOD THEREOF

FIELD OF INVENTION

The present invention is related to a microplasma device and a system thereof, especially to a microplasma device and a corresponded system that eject microplasma array to achieve mass production of nanomaterials.

BACKGROUND OF THE INVENTION

Microplasma is a high energy density plasma source which has been widely used in various fields adopted as a microplasma device. One of the most commonly use is to produce nanomaterials like metal nanoparticles, graphene quantum dots, silicon quantum dots and metal clusters. Microplasma can also apply to produce Plasma Activated Water (PAW) as a new trendy application. Such high density energy allows PAW to have a large number of active substances and free radicals to be able to use for general daily sterilization, agricultural growth, irrigation and pathogen control purposes. Microplasma become a popular technology and draws more and more attention with its high energy density but yet small size reaction device.

Although the microplasma device has many advantages as mentioned above, it is still struggled with the low conversion rate or the low yields rate inherited by its extremely low power. In order to provide high voltage energy, a disproportionate large size of power supply equipment is necessary but resulting with poor space utilization. Many ruthless facts for such potential device have made lots of manufactories hesitating to introduce microplasma device into real production. Hence, it is eager to have a solution that will overcome or substantially ameliorate at least one or more of the deficiencies of a prior art, or to at least provide an alternative solution to the problems. It is to be understood that, if any prior art information is referred to herein, such reference does not constitute an admission that the information forms part of the common general knowledge in the art.

SUMMARY OF THE INVENTION

In order to solve the problems of the conventional microplasma device with low conversion rate or low yields rate, the present invention provides a new design microplasma device comprises:

- a reaction tank containing a reaction solution;
- the reaction solution contains a nanomaterial and/or a precursor;
- a first electrode is at least partially immersed in the reaction solution;
- a second electrode is provided with a microplasma source to emit a microplasma formed from a plasma gas to a surface of the reaction solution in a form of array; and
- a power supply is electrically connected between the first electrode and the second electrode.

In accordance, a second aspect of the present invention provides a microplasma system using the microplasma device as mentioned above. The microplasma system comprises:

- providing the reaction solution containing the precursor in the microplasma reaction tank;
- immersing at least partially first electrode into the reaction solution;
- inputting the plasma gas into the microplasma source from the gas inlet of the second electrode;
- evenly dispensing, dispersing or diffusing the plasma gas to each microplasma outlets in the array configuration to form the microplasma; and applying the microplasma array to the surface of the reaction solution; and
- synthesizing the nanomaterial from the precursor by the microplasma array.

In accordance, the present invention has the following advantages:

1. The present invention provides a novel microplasma device with modularized design and microplasma array output which could increase a production yields rate compared with the conventional signal microplasma output device. The microplasma array is expandable as desired to increase the reaction energy of the whole device and system. The present invention is more suitable to use DC current power supply to have more stable electricity configuration. The present invention can be applied to the mass production of metal nanoparticles, carbon quantum dots, silicone quantum dots to accelerate commercialization of such materials with greater yield rate.
2. The present invention also provides a modularized microplasma device which can output the microplasma energy in array arrangement. Such design enables the present invention to expand the microplasma array output easily by simply increasing a number of arrays configuration. Multiple validation tests has proven that the microplasma array output can increase the yield rate of the nanomaterial compared with the conventional single microplasma output. The DC current power supply also stabilize the whole device and system providing with more steady electricity input. The present invention has a great potential to introduce into commercialization mass production with greater space utilization for the manufacture by simple device design and improved safety.

Many of the attendant features and advantages of the present invention will become better understood with reference to the following detailed description considered in connection with the accompanying figures and drawings.

BRIEF DESCRIPTION OF THE DRAWINGS

The steps and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
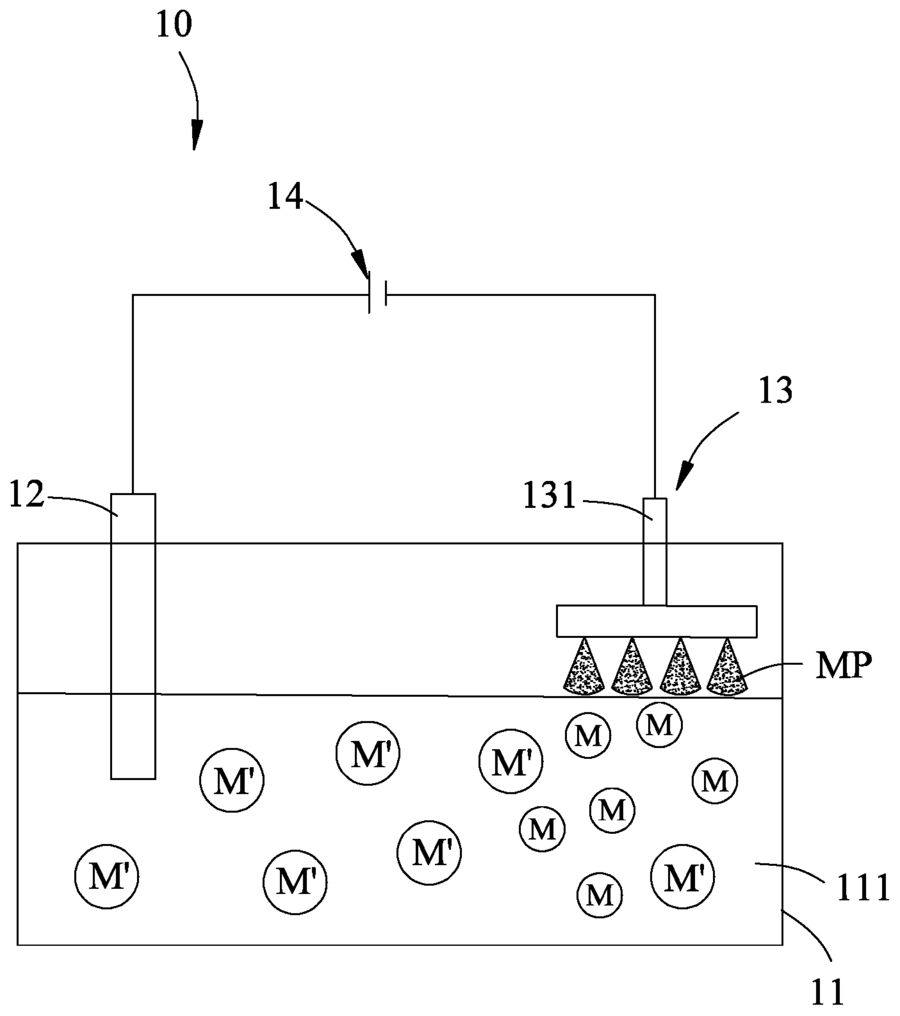
FIG. 1 is a first preferred embodiment of the microplasma device in accordance with the present invention.

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of “a”, “an”, and “the” may include reference to the plural unless the context clearly dictates otherwise. Also, as used in the description herein and throughout the claims that follow, the terms “comprise or comprising”, “include or including”, “have or having”, “contain or containing” and the like are to be understood to be open-ended, i.e., to mean including but not limited to.

<First Preferred Embodiment of Microplasma Device>

With Reference to FIG. 1, a first preferred embodiment of the microplasma device 10 of the present invention comprising:

- a reaction tank 11 containing a reaction solution 111;
- a first electrode 12, which is at least partially immersed in the reaction solution 111;
- a second electrode 13, which is provided with a microplasma source 131 to emit a microplasma MP to a surface of the reaction solution 111 in a form of array (hereinafter may called microplasma array); and
- a power supply 14 is electrically connected between the first electrode 12 and the second electrode 13.

The reaction tank 11 comprises a tank body, which can contain the reaction solution 111 without leakage. Substances or material contained in the reaction solution 111 are different as different timing. However, the reaction solution will at least constantly include a nanomaterial M and/or a precursor M'.

The first electrode 12 of the present invention includes any suitable conductive material. In this embodiment, it is preferably to be a metal foil, such as gold foil (Au foil), silver foil (Ag foil) or platinum foil (Pt foil).

Figure 2:
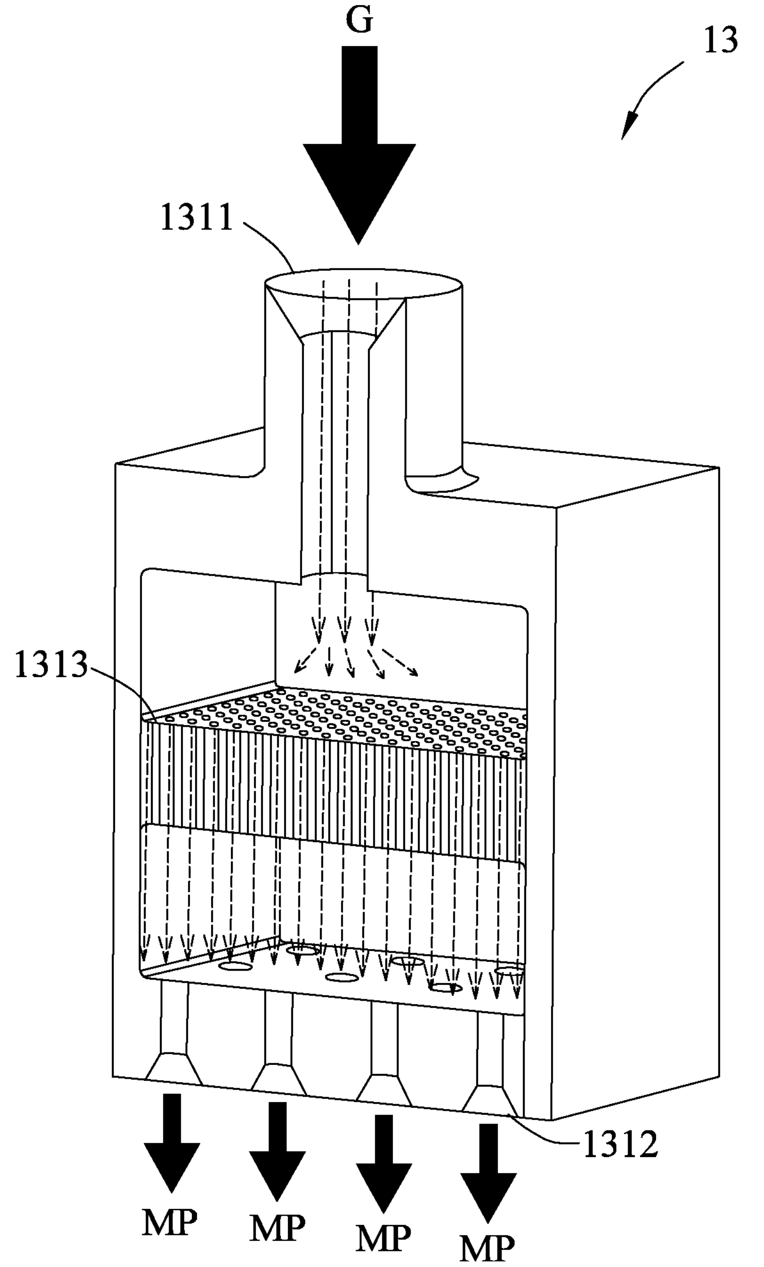
FIG. 2 is a illustration of the microplasma source of the second electrode in accordance with the present invention.
Figure 5:
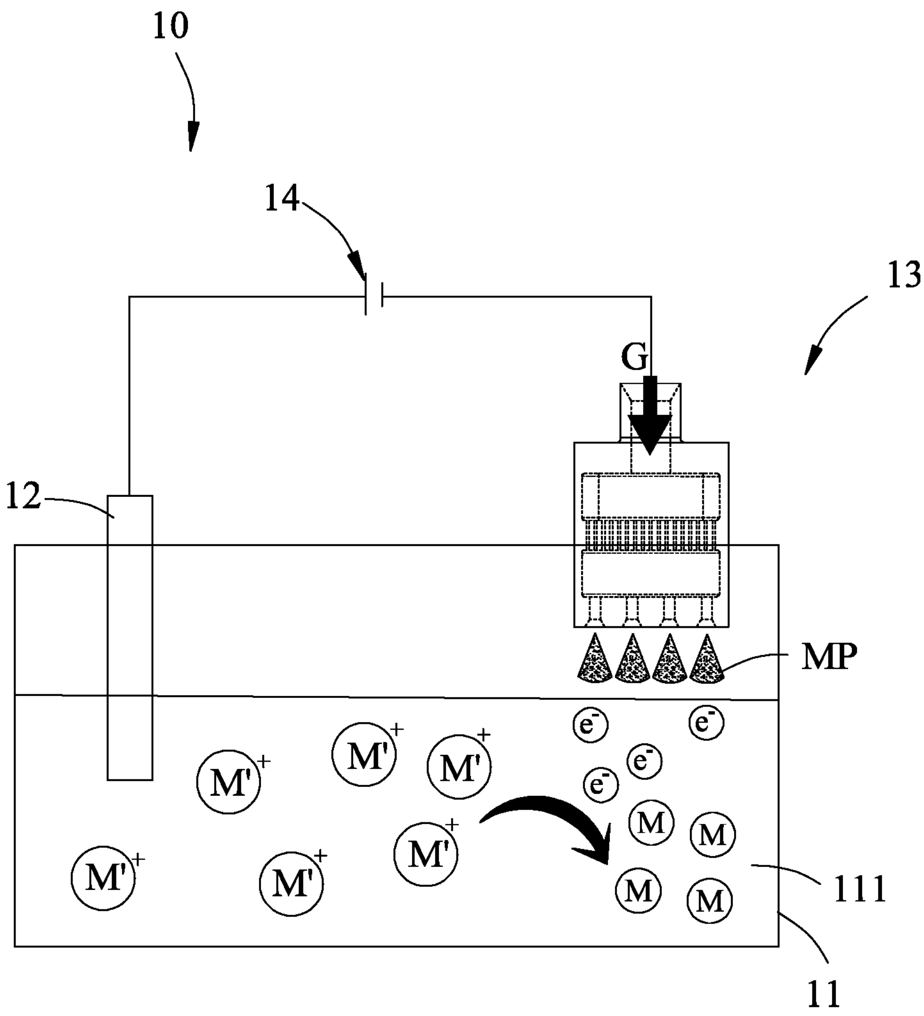
FIG. 5 is a preferred embodiment of the microplasma system in accordance with the present invention.
Figure 6A:
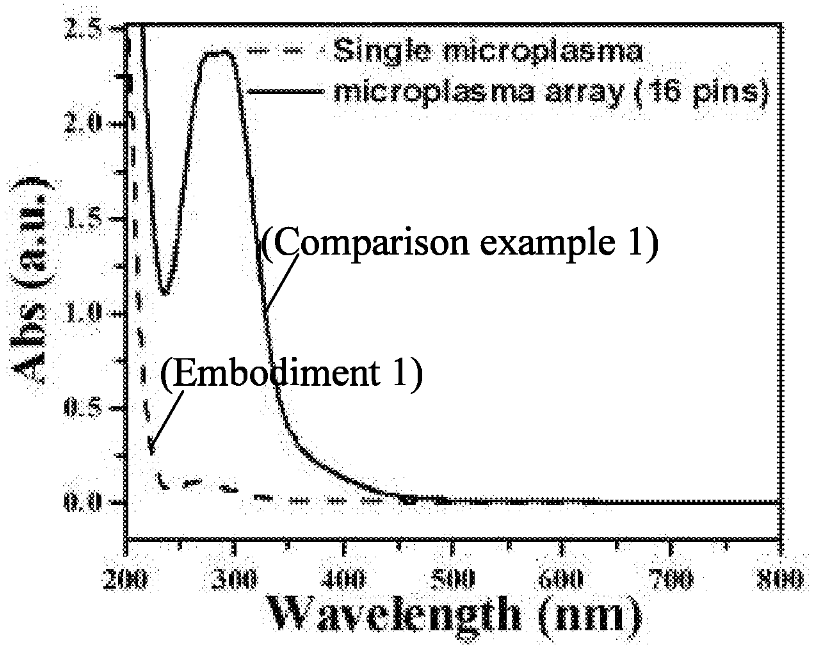
FIGS. 6A to 6D are yields rate results for the embodiments of the present invention and the comparison examples.
Figure 6B:
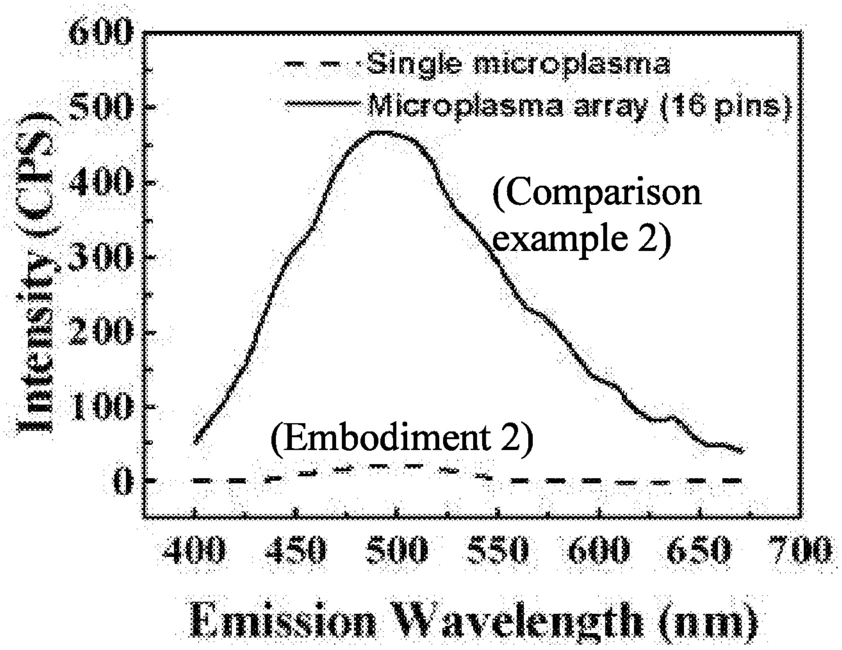
Figure 6C:
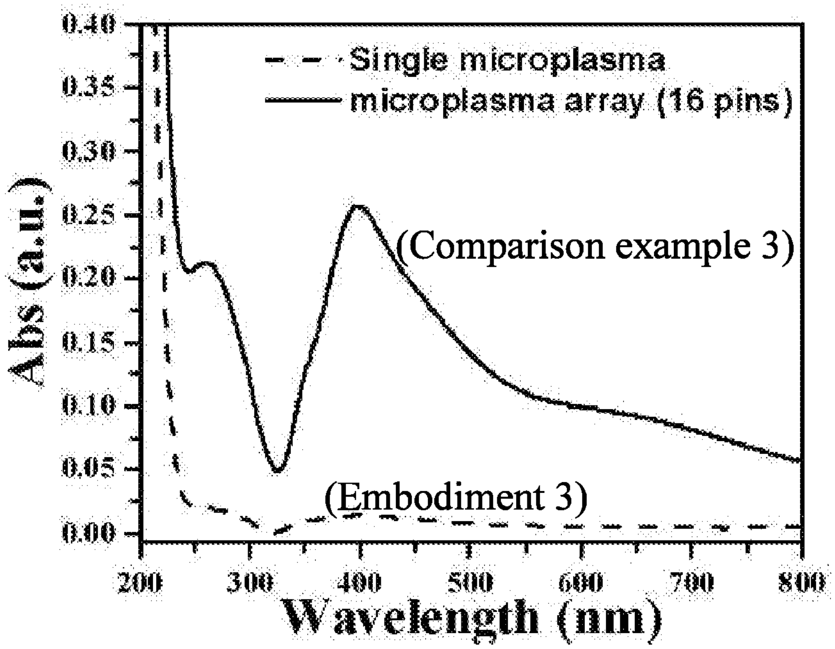
Figure 6D:
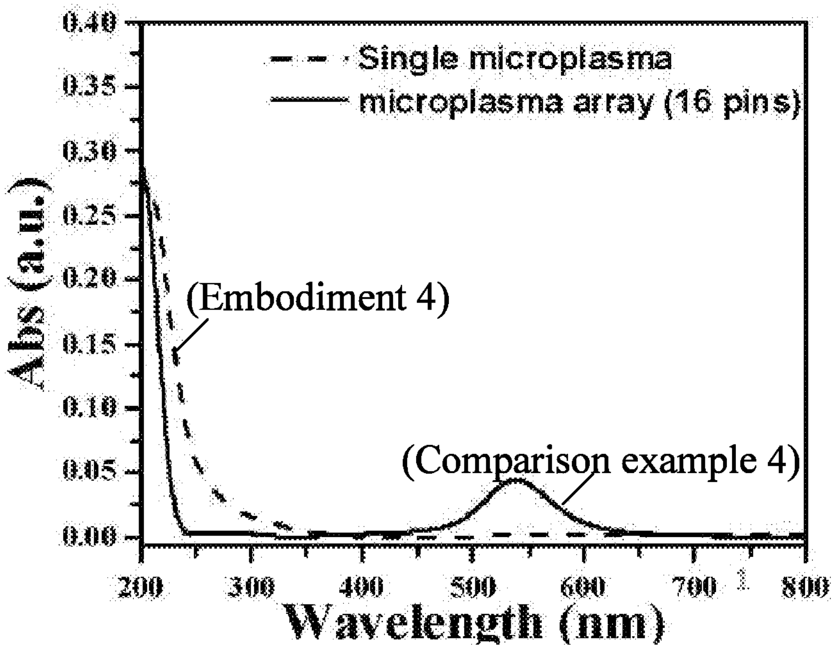

With reference to FIG. 2, the microplasma source 131 in the second electrode 13 includes a gas inlet 1311 and a plurality of microplasma outlets 1312. The microplasma outlets 1312 are arranged in a form of regular and repeated array configuration. The so-called array configuration (or a Matrix in mathematic definition) is the microplasma outlets 1312 being arranged in an ordered, regular and repeated arrangement, for example, in n*m (n and m are preferred to be both positive integer numbers) arrangement. As shown in FIG. 5, this embodiment has 16 microplasma outlets 1312 presented in 4*4 array configuration.

Normally, a number of the gas inlet 1311 is less than a number of the microplasma oulets 1312. In this embodiment, a plasma gas G is input into one gas inlet 1311 and enter to the microplasma source 131 of the present invention. The plasma gas G is preferred to be any suitable inert gas including but not limited to Helium (He), Argon (Ar), Neon (Ne), Nitrogen ($H_2$) or air. The plasma gas G is evenly dispersed or diffused to each of the microplasma outlets 1312, and is applied to the surface of the reaction solution 111 in the form of the microplasma MP in the array arrangement.

As shown in FIG. 2, the plasma gas G passes through a diffuser plate 1313 after entering from the gas inlet 1311 of the microplasma source 131. The plasma gas G is evenly dispersed or diffused to the sixteen microplasma outlets 1312 arranged by 4*4 array to form 16 sources of microplasma MPs sprayed from the microplasma outlets 1312 to the surface of the reaction solution 111.

The power supply 14 may utilize any suitable power supply for generating microplasma, such as a direct current power supply (DC), an alternating current power supply (AC) or a radio frequency power supply (RF). The present invention is preferred to use the DC power supply with more stable current input. A positive electrode and a negative electrode of the power supply 14 can be alternatively connected to the first electrode 12 and the second electrode 13 of the present invention according to requirements. Such approach can resulting the second electrode 13 performs different polarities and provides the microplasma MP carried with corresponded electricity charges.

<Second Preferred Embodiment of Microplasma Device>

Figure 3:
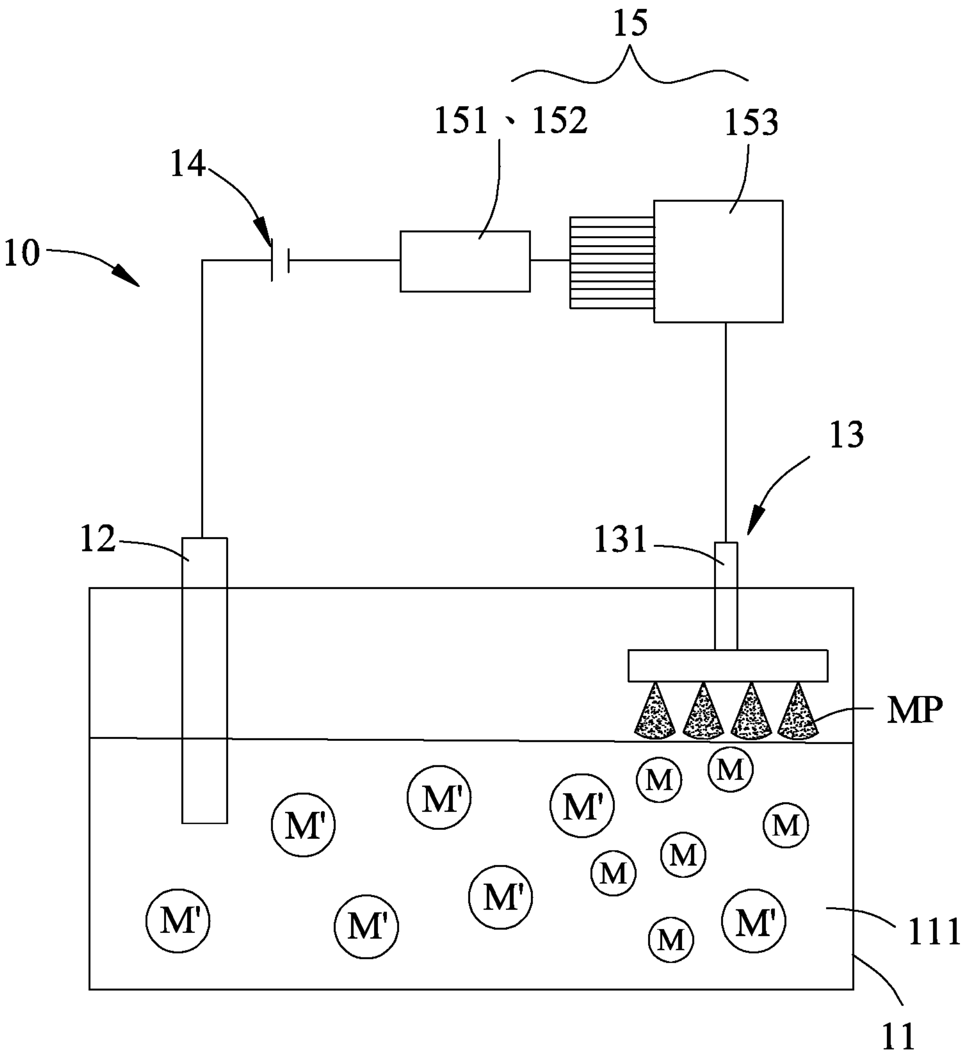
FIG. 3 is a second preferred embodiment of the microplasma device in accordance with the present invention.
Figure 4A:
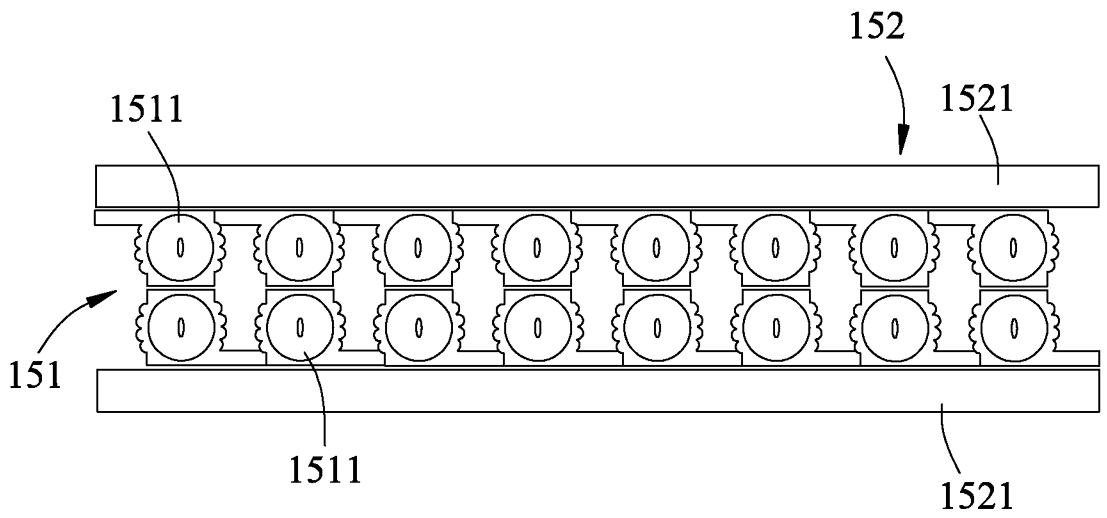
FIGS. 4A and 4B are two illustrations of the resistor module, the heat dissipation module and the circuit board of the voltage and current control device in accordance with the present invention.
Figure 4B:
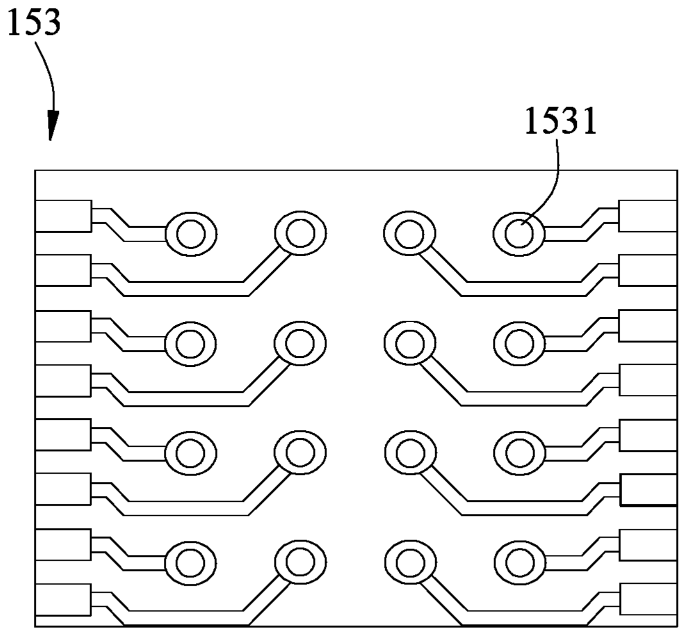

With reference to FIGS. 3, 4A and 4B, a second preferred embodiment of the microplasma device 10 of the present invention is substantially same as the first preferred embodiment as mentioned above. A major difference of the second preferred embodiment to the first one lies on an extra voltage and current control device 15 being connected between the first electrode 12 and the second electrode 13 for a purpose of improving safety of the whole device 10.

The voltage and current control device 15 in this embodiment includes a resistor module 151, a heat dissipation module 152 and a circuit board 153.

As shown in FIG. 4A, the resistor module 151 is preferably comprising multiple resistors 1511 in parallel or series connection. In this embodiment, 16 set of resistors 1511 are in the parallel connection for illustrating. The heat dissipation module 12 is also preferably comprising at least one heat dissipation plate 1521 surrounded the resistor module 151 to achieve a cooling effect. One preferred embodiment for the heat dissipation plate 1521 is to have two aluminum water cooling plates clamped 16 set of resistors 1511 to achieve resistor integration and fast cooling.

With reference to FIG. 4B, the circuit board 153 is preferably comprising a printed circuit board (PCB) with multiple pins 1531 configured thereon. A number of the pins 1531 is preferred to be corresponded to the number of the resistor modules 151 or at least contains enough of pins 1531 to connect with all the resistors 1511 in order to complete electrical circuit integration for the resistor modules 151. The circuit board 153 with the pins 1531 arrangement can also greatly improve operation safety for the microplasma device 10 and reduce the risk of connecting high voltage wires being damage due to overlapping.

<Nanomaterials and Precursors Thereof>

With reference to below table 1, substances or materials contained in the reaction solution 111 at least include the nanomaterial M and/or the precursor M' simultaneously. The reaction solution 111 may also include other ions, composites, compounds, or byproducts synthesized by the precursor M' under the energy striking of the microplasma MP during the reaction period. However, the nanomaterial M and/or the precursor M' are constantly contained in the reaction solution 111. The nanomaterial M is synthesized from the precursor M' after exposure and stimulating by the microplasma MP. The nanomaterial M of the present invention includes a zero-dimensional (OD) nanomaterial in particle form, a one-dimensional (1D) nanomaterial in a columnar or linear form, or a two-dimensional (2D) nanomaterial in a layered or sheet-like form. The size of the nanomaterial M is preferred to have at least one of the dimension being at a range of 1 to 100 nm.

TABLE 1

| Precursor M' | Corresponded Nanomaterial M |
|---|---|
| Fructose, Sodium hydroxide (NaOH) | Graphene quantum dots |
| Ascrobic acid, N-(2-Aminoethyl)-3-aminopropyltrimethoxysilane (AEAPTMS) | Silicone quantum dots |
| Silver nitrate ($AgNO_3$), Fructose | Silver nanoparticles |
| Chloroauric acid ($HACl_4$), Trisodium citrate | Gold nanoparticles |
| Deionized water | Plasma activated water (PAW, Water with reactive oxygen nitrogen particles (RONS)) |

<First Preferred Embodiment of Microplasma System>

With reference to FIG. 5, the first preferred embodiment of the microplasma system of the present invention is implemented by the aforementioned first embodiment of the microplasma device 10. The present invention further provides a manufacturing system for the nanomaterial M using the said microplasma device 10 comprising steps of:

- providing the reaction solution 111 containing the precursor M' in the microplasma reaction tank 11;
- immersing at least partially first electrode 12 into the reaction solution 111;
- inputting the plasma gas G into the microplasma source 131 from the gas inlet 1311 of the second electrode 13;
- evenly dispensing, dispersing or diffusing the plasma gas G to each microplasma outlets 1312 in the array arrangement by for example the diffuser plates 1313 to form the microplasma MP; and applying the microplasma MP array to the surface of the reaction solution 111; and
- synthesizing the nanomaterial M from the precursor M' by the microplasma MP array.

In this preferred embodiment, the power supply 14 may also be included between the first electrode 12 and the second electrode 13. The power supply 14 includes a direct current power supply (DC), an alternating current power supply (AC) or a radio frequency power supply (RF). The present invention is preferred to use the DC power supply with more stable current input. The positive electrode and the negative electrode of the power supply 14 can be alternatively connected to the first electrode 12 and the second electrode 13 of the present invention according to requirements. Such approach can resulting the second electrode 13 performs different polarities and provides the microplasma MP carried with corresponded electricity charges. With reference to FIG. 5, the microplasma MP in this embodiment is carried with negative electricity or is presented as negative polarity as it is connected with the negative electrode of the power supply 14. The microplasma MP hence is able to apply electrons toward the surface of the reaction solution 111 and further make the precursor M' (preferably carried with opposite, or positive electricity) is reacted and synthesized into the nanoparticle M.

With reference to FIG. 5, the second preferred embodiment of the microplasma system of the present invention is implemented by the aforementioned second embodiment of the microplasma device 10 to further include the voltage and current control device 15 between the first electrode 12 and the second electrode 13. Details of the voltage and current control device 15 is same as the second preferred embodiment of the microplasma device 10 as described above.

<Validation Tests of Improved Yields Rate Form the Preferred Embodiments>

With reference to below Table 2, the present invention provides validation tests proving improved yields rate of the nanomaterial M with multiple preferred embodiments/examples of the reaction solution 111, the nanomaterial M and the precursor M' synthesized by the microplasma device 10. The formula or the ratio of the precursor M' in the reaction solution 111 and parameters of the procedures are listed in Table 2. In these series of experiences, the volume of the reaction solution contained in the microplasma reaction tank 11 is set as 20 mL. A comparison sample is further included for each embodiment of the present invention with utilizing single microplasma source instead of microplasma array.

TABLE 2

| Embodiments of the present invention/ Comparison samples | Precursor in the reaction solution | Reaction time (Minute) | Applied Current (mA) | Microplasma arrangement | Nano-material |
|---|---|---|---|---|---|
| Embodiment 1 | 0.1M Fructose, 0.05M | 3 | 160 | 4*4 (16) microplasma array | Graphene quantum dots |
| Comparison sample 1 | NaOH | 3 | 10 | Single microplasma | Graphene quantum dots |
| Embodiment 2 | 0.04M Ascrobic acid. 0.072M | 1 | 160 | 4*4 (16) microplasma array | Silicone quantum dots |
| Comparison sample 2 | AEAPTMS | 1 | 10 | Single microplasma | Silicone quantum dots |
| Embodiment 3 | 0.5 mM $AgNO_3$, 50 mM | 1 | 160 | 4*4 (16) microplasma array | Silver nanoparticles |
| Comparison sample 3 | Fructose | 1 | 10 | Single microplasma | Silver nanoparticles |
| Embodiment 4 | 0.127 mM $HACl_4$, 0.9 mM | 1 | 160 | 4*4 (16) microplasma array | Gold nanoparticles |

TABLE 2-continued

| Embodiments of the present invention/ Comparison samples | Precursor in the reaction solution | Reaction time (Minute) | Applied Current (mA) | Microplasma arrangement | Nano-material |
|---|---|---|---|---|---|
| Comparison sample 4 | Trisodium citrate | 1 | 10 | Single microplasma | Gold nanoparticles |
| Embodiment 5 | Deionized water | 1 | 160 | 4*4 (16) microplasma array | Plasma activated water |
| Comparison sample 5 | | 1 | 10 | Single microplasma | Plasma activated water |

With reference to below Table 3 and FIG. 6A to FIG. 6D, yield 2 rate results of each embodiment and comparison sample are presented corresponded with aforementioned table 2. As shown in FIG. 6A, FIG. 6B, FIG. 6C and FIG. 6D, yield rate results of graphene quantum dots, silicone quantum dots, silver nanoparticles and gold nanoparticles are presented with the comparison samples 1 to 5 respectivly. The yield rate has dramatically and significantly increased of the present invention to at least 22 times or up to 44 times by using microplasma array than the single microplasma source.

Reference indicators showed in table 3 and FIGS. 6A to 6D are absorbance at 270 nm for graphene quantum dots (the absorption peak of carbon-carbon double bond is proportional to the yield of the graphene quantum dot); intensity of 502.7 nm emission with 370 nm excitation for silicone quantum dots (the strongest emission peak of silicon quantum dots is proportional to its yield); absorbance at 400 nm for silver nanoparticles (the absorption peak of silver nanoparticles is proportional to its yield); and absorbance at 540 nm for gold nanoparticles (the absorption peak of gold nanoparticles is proportional its yield). Plasma activated water (PAW) has its reference indicator as increased conductivity with increased oxidation-reduction potential (ORP). The higher ORP means the higher of the concentration of peroxynitrite ions with better plants growth and antibacterial effects. Also, the increased ORP means higher concentration of hydrogen peroxide and hydroxyl groups for better antibacterial effects.

TABLE 3

| Embodiments of the present invention/ Comparison samples | Reference: Yields (Unit) | Yields Increased Rate (Embodiments/ Comparison samples) |
|---|---|---|
| Embodiment 1 | Absorbance at 270 nm: 0.1 (OD) | 23 |
| Comparison sample 1 | Absorbance at 270 nm: 2.3 (OD) | |
| Embodiment 2 | Intensity of 502.7 nm emission with 370 nm excitation: 20.5 (CPS) | 22.7 |
| Comparison sample 2 | Intensity of 502.7 nm emission with 370 nm excitation: 465.7 (CPS) | |
| Embodiment 3 | Absorbance at 400 nm: 0.014 (OD) | 18.6 |
| Comparison sample 3 | Absorbance at 400 nm: 0.26 (OD) | |
| Embodiment 4 | Absorbance at 540 nm: 0.001(OD) | 44 |
| Comparison sample 4 | Absorbance at 540 nm: 0.044 (OD) | |
| Embodiment 5 | Increasement of conductivity: 36 mS/cm; Increasement of ORP: 58 mV | Increasement of conductivity: 2.9; Increasement of ORP: 1.9 |
| Comparison sample 5 | Increasement of conductivity: 104 mS/cm; Increasement of ORP: 110 mV | |

<Microplasma Electrical Effect Tests>

With reference to below Table 4 and FIGS. 7A and 7B, the power supply 14 can be alternatively connected between the first electrode 12 and the second electrode 13 to have such two electrodes 12 and 13 presented with different polarities.

Figure 7A:
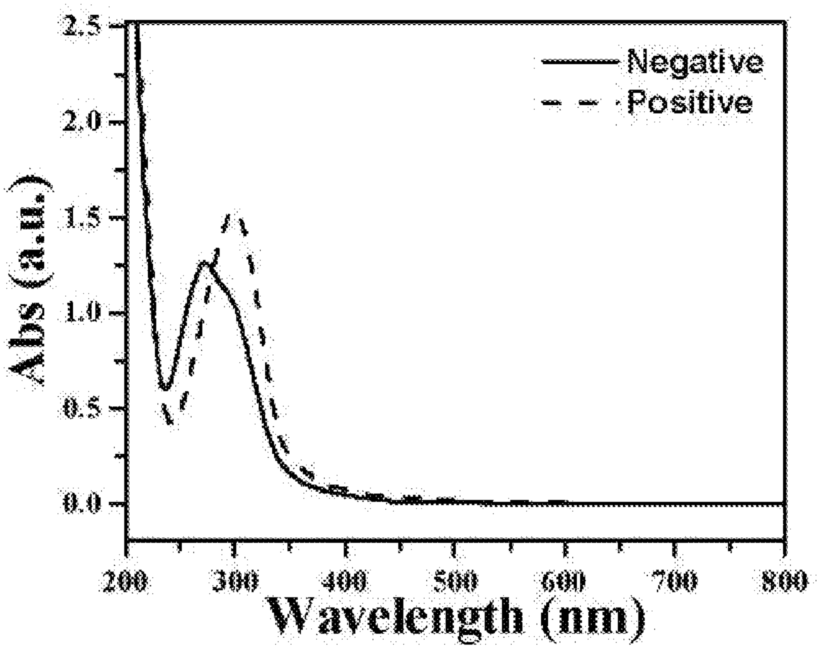
FIGS. 7A and 7B are yields rate results for the embodiments of the present invention being process with the microplasma source in different polarities.
Figure 7B:
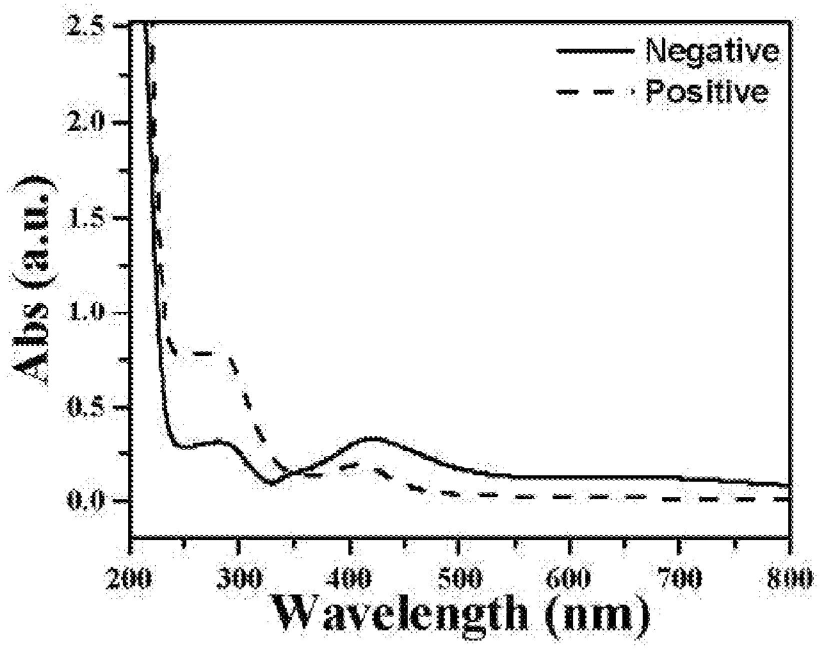

As shown in Table 4 and FIGS. 7A and 7B, simply by alternating the positive electrode and the negative electrode of the power supply 14 connected with the second electrode 13 of the present invention, the yields rate of the nanomaterial M will have significant changes or even have a higher yields rate. When the positive electrode of the power supply 14 connected to the second electrode 13, the microplasma MP carried with positive charges will be emit from the second electrode 13 to the reaction solution 111. Such positive microplasma MP generally has higher energy potential or greater energy density to generate a higher yield for the nanomaterial M.

According to the electrical property of the precursor M' in the reaction solution 111, the present invention could obtain a better yield rate by connecting one of the opposite polarity of the electrode of the power supply 14 with the second electrode 13. For example, the precursors M' carried with positive charges like metal ions tend to be attracted by the negative electrode. Hence, it is preferred to have the second electrode 13 connected with the negative electrode of the power supply 14 to be able to emit the microplasma MP carried with negative charges leading to a higher yields of the nanomaterial. As shown in FIG. 7A, it shows different yields rate results of the graphene quantum dots in the embodiment 1 simply by alternating the positive electrode and the negative electrode of the power supply 14 with the second electrode 13 to emit the microplasma MP carried opposite charges. The same result is also observed in the yield rate result of the sliver nanoparticles of the embodiment 3.

TABLE 4

| Embodiment | Nanomaterial | Volume of the reaction tank (mL) | Current (mA) | Reaction time (Minute) | Polarity of the microplasma | Reference: Yields (Unit) |
|---|---|---|---|---|---|---|
| 1 | Graphene quantum dots | 10 | 10 | 10 | + | Absorbance at 270 nm: 1.54 (OD) |
| | | | | | − | Absorbance at 270 nm: 1.26 (OD) |
| 3 | Silver nanoparticle | 10 | 10 | 20 | + | Absorbance at 400 nm: 0.19 (OD) |
| | | | | | − | Absorbance at 400 nm: 0.33 (OD) |
| 5 | PAW | 20 | 10 | 10 | + | Increasement of conductivity: 532 mS/cm; Increasement of ORP: 208 mV |
| | | | | | − | Increasement of conductivity: 245 mS/cm; Increasement of ORP: 153 mV |

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. A microplasma device comprising:

a reaction tank containing a reaction solution; the reaction solution contains a nanomaterial and/or a precursor;

a first electrode at least partially immersed in the reaction solution, wherein the first electrode comprises a conductive material;

a second electrode is provided with a microplasma source; the microplasma source includes a gas inlet and a plurality of microplasma outlets arranged in a form of regular and repeated array configuration to emit a microplasma formed from a plasma gas to a surface of the reaction solution in a form of array;

the plasma gas passes through a diffuser plate after entering from the gas inlet of the microplasma source and evenly dispersed or diffused to the microplasma outlets to form a plasma-liquid coupled reaction zone at the surface of the reaction solution, and wherein the plasma gas comprises Helium, Argon, Neon, Nitrogen or air;

a power supply is electrically connected between the first electrode and the second electrode; and a voltage and current control device electrically connected between the first electrode and the second electrode, the voltage and current control device comprising:

a resistor module including a plurality of resistors electrically connected in parallel or in series;

a heat dissipation module including at least one heat dissipation plate physically surrounding and clamping the plurality of resistors so as to integrate the resistors and provide cooling; and a circuit board comprising a printed circuit board (PCB) having a plurality of pins arranged thereon, the number of pins corresponding to, or being sufficient to electrically connect with, each of the plurality of resistors so as to complete electrical circuit integration between the resistor module and the first and second electrodes and to form a plurality of current paths corresponding to the plurality of microplasma outlets;

wherein the voltage and current control device regulates and stabilizes the electrical energy delivered from the first electrode to the second electrode such that each microplasma outlet of the diffuser plate receives substantially uniform plasma intensity from a single plasma source sufficient for nanomaterial synthesis;

wherein, by switching polarity between the first electrode and the second electrode, synthesis efficiency of the nanomaterial is adjustable according to charge characteristics of different nanomaterial precursors.

2. The microplasma device as claimed in claim 1, wherein: the microplasma outlets arranged in a form of regular and repeated n*m array configuration where n and n are both positive integer numbers.

3. The microplasma device as claimed in claim 1, wherein: the power supply is a direct current power supply.

* * * * *